United States Patent [11] 3,622,672

| [72] | Inventors | Eugene Leroi;<br>Albert Beaufour; Gerard Beaufour, all of Paris, France |
|---|---|---|
| [21] | Appl. No. | 801,228 |
| [22] | Filed | Jan. 30, 1969 |
| [45] | Patented | Nov. 23, 1971 |
| [73] | Assignee | Societe D'Etudes De Produits Chimiques Issy-les-Moulineaux, France |
| [32] | Priority | Feb. 11, 1963 |
| [33] | | Great Britain |
| [31] | | 5,448/63 |
| | | Continuation-in-part of Ser. No. 342,776, Feb. 5, 1964, abandoned.<br>Continuation-in-part of application Ser. No. 660,064, Aug. 11, 1967, now abandoned.<br>This application Jan. 30, 1969, Ser. No. 801,228 |

[54] SYNERGISTIC MIXTURE OF 5-METHYL 7-BROMO 8-HYDROXY QUINOLINE AND N-DODECYL SULPHATE OF 5-METHYL 8-HYDROXY QUINOLINE
1 Claim, No Drawings

[52] U.S. Cl. .................................................... 424/258
[51] Int. Cl. .................................................... A61k 27/00
[50] Field of Search .......................................... 424/258

[56] References Cited
UNITED STATES PATENTS

| 3,085,984 | 4/1963 | Degewer et al. | 424/258 |
| 3,223,704 | 12/1965 | Shibe et al. | 424/258 |
| 3,290,315 | 12/1966 | Watson | 424/258 |
| 3,377,352 | 4/1968 | Clark et al. | 260/286 |

*Primary Examiner*—Jerome D. Goldberg
*Attorney*—Arnold Robinson

ABSTRACT: A mixture of n-dodecyl sulfate of 5-methyl-8-hydroxy quinoline alone and 5-methyl-7-bromo-8-hydroxy quinoline as a pharmaceutically active material for administering bacteriostatic, parasiticidic or fungistatic dosage to living bodies.

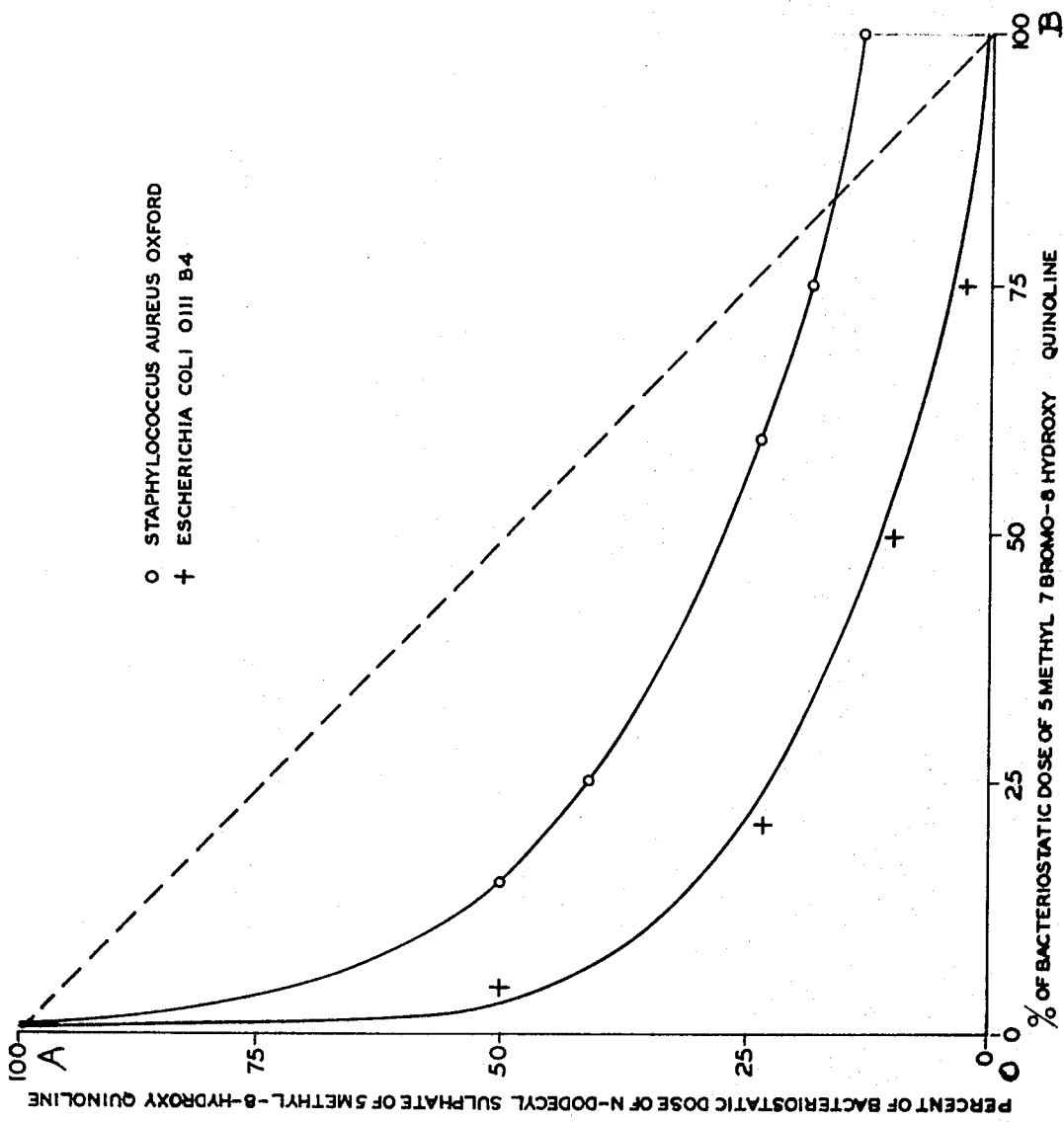

SYNERGISTIC MIXTURE OF 5-METHYL 7-BROMO 8-HYDROXY QUINOLINE AND N-DODECYL SULPHATE OF 5-METHYL 8-HYDROXY QUINOLINE

This application is a continuation-in-part of our copending application, Ser. No. 342,776, filed Feb. 5, 1964, and of application, Ser. No. 660,064, filed Aug. 11, 1967, both now abandoned.

This invention relates to therapeutic compositions comprising the n-dodecyl sulfate of 5-methyl-8-hydroxy quinoline in association with 5-methyl-8-hydroxy quinoline.

The n-dodecyl (or lauryl) sulfate of 5-methyl-8-hydroxy quinoline, which is described and claimed in our copending application, Ser. No. 732,797 filed May 6, 1968, now U.S. Pat. No. 3,462,437, possesses desired antiseptic, bactericidal, parasiticidal, and fungicidal properties. It is soluble in hot distilled water, highly soluble in methyl and ethyl alcohols and in chloroform, poorly soluble in acetone, ether and benzene and insoluble in dioxane and tetrahydrofurane. The compound moreover has a very low toxicity.

It can be prepared by dissolving half a mole (144 g.) of sodium n-dodecyl sulfate in 5 liters of water and adding to it at 60° C. under constant agitation, small amounts of a solution of half a mole (79.5 g.) in the stoichiometrical quantity of 0.5 N hydrochloric acid in 500 ml. of water.

On completion of the addition the agitation is continued for 2 more hours at 60° C. when the mixture is allowed to cool while still continuing the agitation. A precipitate forms and is filtered off, washed with iced water and dried over sulfuric acid or phosphoric acid under vacuum. It is then crystallized from methyl ethyl ketone, drained off and dried. The yield is 90 percent and the compound is a yellow microcrystalline powder having an instantaneous melting point of 107°–108° C.

On analysis the composition of the substance is found to correspond to the formula $C_{12}H_{25}OSO_3H \cdot C_{10}H_9ON$.

Toxicological investigations have shown the compound to have low toxicity to the white mouse, as well as high bacteriostatic, parasiticidic, bactericidal, antifungic and antiamoebic activities and hence of considerable interest in therapeutic applications.

A particularly effective therapeutic composition comprises the n-dodecyl sulfate of 5-methyl-8-hydroxy quinoline and 5-methyl 7-bromo-8-hydroxy quinoline.

The therapeutic value of this mixture was discovered during a series of tests made on numerous derivatives of 5-methyl-8-hydroxy quinoline. Both the n-dodecyl sulfate of 5-methyl-8-hydroxy quinoline and the 5-methyl-7-bromo-8-hydroxy quinoline possess strong bacteriostatic, parasiticidic, and fungistatic activity when applied in very low or weak doses.

These properties were determined by the following methods:

a. Determination of bacteriostatic activity

This was obtained by dilution technique on liquid gelose. A constant amount of germs (1,000) placed in 1 ml. of gelose was treated by decreasing doses of each product until minimal dose stopping the growth of germs for 24 hours was found. The temperature was 24° C. Many bacteria were tested and the results are reported hereunder in the table (the bacteriostatic dose is given in μg./ml.).

| Bacteria | 5-methyl 7-bromo 8-hydroxy quinoline | N-dodecyl sulfate of 5-methyl 8-hydroxy quinoline |
|---|---|---|
| Staphylococcus aureus Oxford | 5 | 20 |
| Staphylococcus aureus 101 | 8 | 22.5 |
| Staphylococcus aureus 11071 | 9 | 22.5 |
| Staphylococcus aureus 11146 | 9 | 20 |
| Staphylococcus aureus 11152 | 9 | 20 |
| Streptococcus pyogenes L 163 | 8 | 8 |
| Streptococcus faecalis ATCC 9790 (enteroque) | 12.5 | 8 |
| Escherichia coli O111 B4 | 27.5 | 90 |
| Escherichia coli L 416 | 10 | 40 |
| Shigella dysenteriae | 4 | 22 | b. Determination of fungistatic activity

The technique used was the same as above except that the temperature was 37° C. and evolution of the growth was examined after 4 days. This experimentation has been made only on candide albicans and the fungistatic doses found were 3,75 μg./ml. for both compounds.

c. Determination of LD 50

This determination has been effected per os, by the usual techniques on rats and mice; it has been found to be 4,1 g./kg. for 5-methyl 7-bromo 8-hydroxy quinoline and 14 g./kg. for n-dodecyl sulfate of 5-methyl 8-hydroxy quinoline. No side effects were noted and daily doses as high as 1 g./kg. for the first-mentioned compound and 3 g./kg. for the second-mentioned compound were supported for 42 days by rats without appreciable difference with nontreated animals.

Finally, the activity of a mixture of both compounds has been tested and compared to the activity of each compound alone.

This experimentation was made by the following method, for bacteriostatic activity on Staphylococcus Aureus Oxford and Escherichia Coli O111 B4. The technique used was by dilution in salted peptone broth. Six series of tubes containing 0 to 100 percent of the bacteriostatic dose of each received an amount comprised between 60 to 0 percent of the bacteriostatic dose of the other, said amount being the same in a same series.

To each tube was added 5 ml. of salted peptone broth and 5 ml. of bacteria suspension containing 2 million germs per ml. (The enumeration of germs was done by opacity with Meunier's electrophotometer.) The incubation time was 48 hr. at 37° C.

The bacteriostatic values of this association are reported on an accompanying drawing of a curve wherein the percentage of bacteriostatic dose of n-dodecyl sulfate of 5-methyl 8-hydroxy quinoline is plotted against the percentage of bacteriostatic dose of 5-methyl 7-bromo 8-hydroxy quinoline, and this for both bacteria. Bacteriostatic action of the first compound alone is represented by A whereas B represents bacteriostatic dose of the second. For the portions of curve comprised in OAB, there is synergistic effect between both compounds. All along AB there is mere addition; beyond AB, there is inhibition.

The following curves show a strong synergistic effect in bacteriostase over Escherichia Coli O111 B4, a good synergistic effect in bacteriostase over Staphilococcus Aureus Oxford, between 0 and 83 percent of bacteriostatic dose of 5-methyl 7-bromo 8-hydroxy quinoline.

The examination of the results shows an appreciable advantage of this association over both compounds alone.

For instance, in the case of Escherichia Coli O111 B4, with 50 percent of bacteriostatic dose of 5-methyl 7-bromo 8-hydroxy quinoline, 12,2 percent of n-dodecyl sulfate of 5-methyl 8-hydroxy quinoline give the same bacteriostase as 100 percent of each alone, i.e., 13,7 g. of the first plus 11 g. of the second (twice less toxic as the first) give 24,7 g. of an association which, in its whole, is less toxic than any of the compounds considered alone. Similarly, it has been noticed that 20 percent of the bacteriostatic dose of 5-methyl 7-bromo 8-hydroxy quinoline (i.e., 5.5 g.) plus 25 percent of the bacteriostatic dose of n-dodecyl sulfate of 5-methyl 8-hydroxy quinoline (i.e., 22.5 g.) give the same bacteriostase as 100 percent of each alone.

In the case of Staphylococcus Aureus Oxford, with 35 percent of the bacteriostatic dose of 5-methyl 7-bromo 8-hydroxy quinoline (i.e., 1.6 g.) plus 30 percent of the bacteriostatic dose of n-dodecyl sulfate of 5-methyl 8-hydroxy quinoline (i.e., 6 g.) there is obtained the same bacteriostase as with 100 percent of each alone.

Taking into account the two preceding remarks there were prepared gelules having substantially the same proportions of active ingredients, i.e., about one-fourth in weight, thus for one gelule:

| | |
|---|---|
| 5-methyl 7-bromo 8-hydroxy quinoline n-dodecyl sulfate of 5-methyl 8-hydroxy | 0.060 g. |

| | |
|---|---|
| quinoline | 0.250 g. |
| lactose (excipient) | 0.115 g. |

The above example seems to be the most appropriate but the proportions can be varied and nevertheless lead to advantageous compositions, provided the effective amount of 5-methyl-7-bromo-8-hydroxy quinoline be under 83 percent of the bacteriostatic dose of this product on *Staphylococcus Aureus* Oxford and that the points representing these compositions calculated with respect to 100 percent bacteriostatic dose of each component, be on or close to the curve of bacteriostase of said *Staphylococcus Aureus Oxford*.

These preparations are useful in the treatment of infection provoked by Staphylococci, Coli amibias and Candidas i.e., accute diarrheas, colopathies, post amibian colitis and various colitis, candida albicans diarrhea, amibiasis. Moreover a very good action has been noticed in treatment of infections by amoeba and parasites. As to the dosology to be used, about 2.5 g. per diem i.e., 8 gelules, are the normal dose for treatment of about 10 days. In case of very strong infections, 5 g. may be used, i.e., 16 gelules per diem for 1 or 2 days and then the treatment is continued with 6–8 gelules per diem as long as necessary (generally about 1 week). For prophylactic purposes, 1–2 gelules per diem are enough.

Such results could not have been predicted in the light of other experiments. Thus, this invention provides a combination having marked bacteriostatic and fungistatic effects which allows applications related to bacteria and fungi to be cured with less drug than if the components of the combination were used alone. Although no side effects were noted with the components when used alone, the reduction in quantity of the efficient dose provides more safety in this respect and allows the administration of a less toxic drug.

5-methyl 8-hydroxy quinoline and 5-methyl 7-bromo 8-hydroxy quinoline were prepared by the methods indicated by "Oxine and its Derivatives" R.G.W. HOLLINGSHEAD— BUTTERWORTHS SCIENTIFIC PUBLICATION (LONDON, 1956) pages 790 and 794–795.

We claim:

1. A synergistic mixture for the therapeutic treatment of infections derived from *Staphylococci Escherichia Coli*, or *Candidas albicans*, which comprises about 20 percent by weight of 5-methyl 7-bromo 8-hydroxy quinoline and about 80 percent by weight of n-dodecyl sulfate of 5-methyl 8-hydroxy quinoline.

* * * * *